(No Model.)

H. WESTON & E. T. STARR.
ARTIFICIAL TOOTH CROWN.

No. 287,354. Patented Oct. 23, 1883.

WITNESSES:
Wm A. Skinkle
Geo W Young

INVENTORS
Henry Weston & Eli T. Starr,
By their Attorneys
Baldwin Hopkins & Peyton

United States Patent Office.

HENRY WESTON AND ELI T. STARR, OF PHILADELPHIA, PENNSYLVANIA, ASSIGNORS TO THE S. S. WHITE DENTAL MANUFACTURING COMPANY, OF SAME PLACE.

ARTIFICIAL TOOTH-CROWN.

SPECIFICATION forming part of Letters Patent No. 287,354, dated October 23, 1883.

Application filed May 8, 1883. (No model.)

*To all whom it may concern:*

Be it known that we, HENRY WESTON and ELI T. STARR, both of the city and county of Philadelphia, in the State of Pennsylvania, have invented certain new and useful Improvements in Artificial Tooth-Crowns, of which the following is a specification.

Our invention relates to artificial tooth-crowns for application to natural roots remaining in the mouth; and its objects are to improve such crowns, to the end that they may be readily applied and securely fastened in place upon the root, so as to be strong and durable, and that they may be easily and cheaply manufactured.

The subject-matter claimed is particularly pointed out at the close of the specification.

Figure 1:
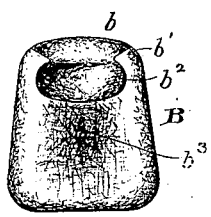
Figure 2:
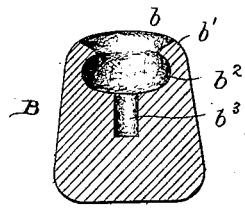
Figure 4:
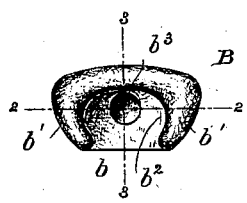
Figure 3:
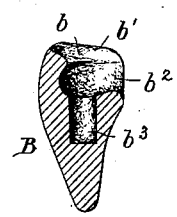
Figure 5:
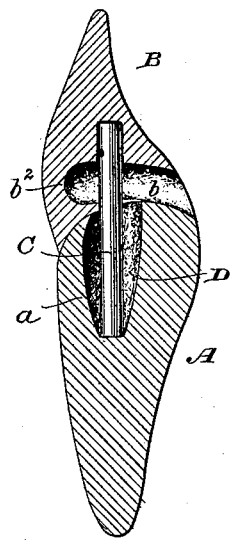

In the accompanying drawings, which illustrate our improvements, Figure 1 is a view of the rear or lingual side of an incisor-crown of our improved construction. Fig. 2 is a section therethrough on the line 2 2 of Fig. 4. Fig. 3 is a section therethrough at right angles to the plane of section of Fig. 2, taken on line 3 3 of Fig. 4; and Fig. 4 is a plan view of the base or neck end of such a crown. Fig. 5 is a longitudinal section through the root and crown, showing the manner of applying our improvements.

As is usual in such cases, the root A is prepared for the reception of the artificial crown B by cutting or grinding it off to about a level with the gum. A vertical opening, $a$, is then formed in the root, to receive an anchoring-post, C, which is secured in position in the root, with its upper end projecting beyond it, by means of a suitable filling—such as cement or amalgam, D—the root being filled up to its outer or neck end, and at that end is preferably slightly convex, as shown in Fig. 5. The post C is preferably a barbed, shouldered, serrated, or screw-threaded post, to afford a firm hold for the filling material of the root, and for the filling material of the crown, into which the post projects, to keep said crown from pulling off the post or being loosened thereon.

Our improved crown is preferably constructed wholly of porcelain—a material well known in the arts, and of which artificial teeth and crowns are usually constructed. A vertical opening or recess is formed in the crown, extending from its neck or base end into the crown, as usual. In this instance this opening is of peculiar construction. The mouth $b$ of the crown-opening tapers or slopes inward for a short distance, so as to form at the base or extreme end of the crown a thin edge, $b^2$, to enable correct and close joining between the root and crown to be effected. The tapered mouth of the crown-opening communicates with an undercut recess or groove, $b^2$, and said undercut recess or groove in turn communicates with a preferably reduced cylindrical opening, $b^3$, extending vertically, and preferably centrally, in the crown toward its cutting or grinding edge or face. The tapered mouth and undercut recess of the crown-opening receive the filling material which is to secure the crown in position upon the root, and permit the passage of the outer or projecting end of the anchoring-post to the post-opening $b^3$ to be snugly fitted therein, as clearly shown in Fig. 5. The opening of the crown, up to the point of communication with the reduced portion $b^3$ of said opening, is not entirely surrounded by the edge of the neck or base of the crown, but said opening extends back and through the rear wall or lingual surface of the crown, so that when the crown is fitted to the root, and the projecting end of the anchoring-post is seated in the opening $b^3$, the filling material, which unites the crown firmly to said post, may be filled in from the back of the crown, as clearly shown in Fig. 5. Our improved crown then has an opening therein, having a flaring or tapering mouth, $b$, at the end of the crown, a recessed or undercut portion, $b^2$, communicating with said mouth portion, and a reduced portion, $b^3$, communicating with the undercut portion of said opening, while the said crown-opening is extended at the rear to the lingual surface of the crown, so as to enable the filling material to be applied from the back of the crown, whereby an unnoticeable and secure fastening for the crown may be effected.

In applying our improved crowns the post is anchored in the root, and the thin edge of the crown is then nicely fitted to the anterior edge of the root, a thin film of plastic filling material preferably being interposed between the edge of the crown and root, to insure a tight joint. This is a common practice in setting artificial crowns. The crown and root are then, with the adjoining teeth and gum, invested with a paste—of plaster-of-paris, for example—which soon hardens or sets. After the investment has hardened, the opening in the crown is filled from the rear thereof with foil, cement, amalgam, or other suitable filling material such as is used for dental purposes.

Owing to the bite or grasp the filling takes upon the post C and upon the crown by its undercut opening, the crown is securely fastened upon the root, and is capable of good service in lieu of the natural crown.

By reason of the projecting end of the anchoring-post extending into and snugly fitting an opening formed centrally in the crown, a larger post may be used, and a very firm and rigid connection and support for the crown by the post and filling material is afforded.

We have shown in the drawings incisor-crowns only as constructed according to our invention. It will be understood, however, that our improvements are equally applicable to cuspid, bicuspid, and molar crowns.

Having thus described our improvements, what we claim herein as of our joint invention is—

An artificial tooth-crown having an opening therein to receive the means of fastening the crown to the natural root, said opening consisting of an enlarged portion at the neck or base of the crown, extending through the rear or lingual wall thereof, and of a reduced post-receiving portion inclosed by the rear wall of the crown, substantially as described.

In testimony whereof we have hereunto subscribed our names this 7th day of May, A. D. 1883.

HENRY WESTON.
ELI T. STARR.

Witnesses:
S. T. JONES,
J. A. B. WILLIAMS.